United States Patent [19]

Satchell, Jr. et al.

[11] Patent Number: 4,594,132
[45] Date of Patent: Jun. 10, 1986

[54] CHLORIDE HYDROMETALLURGICAL PROCESS FOR PRODUCTION OF COPPER

[75] Inventors: Donald P. Satchell, Jr., Princeton Junction, N.J.; John N. Gerlach, Morenci, Ariz.

[73] Assignee: Phelps Dodge Corporation, New York, N.Y.

[21] Appl. No.: 625,139

[22] Filed: Jun. 27, 1984

[51] Int. Cl.$^4$ ............................ C25C 1/00; C25C 1/12
[52] U.S. Cl. ................................ 204/105 R; 204/107; 75/101 R; 75/109; 75/117
[58] Field of Search ....................... 75/101 R, 108, 109, 75/111, 114, 117; 204/105 R, 106, 107

[56] References Cited

U.S. PATENT DOCUMENTS

| | | | |
|---|---|---|---|
| 86,754 | 2/1969 | Hunt et al. | 75/117 |
| 290,548 | 12/1985 | Drouin | 75/101 R |
| 364,174 | 5/1887 | Hunt et al. | 75/117 |
| 415,576 | 11/1889 | Siemens | 204/105 R |
| 415,738 | 11/1889 | Seegall | 204/107 |
| 507,130 | 10/1893 | Hoepfner | 204/105 R |
| 552,960 | 1/1896 | Hoepfner | 204/105 R |
| 704,639 | 7/1902 | Hoepfner | 204/105 R |
| 740,014 | 9/1903 | Herman | 75/101 R |
| 1,148,798 | 8/1915 | Pyne et al. | 204/105 R |
| 1,195,616 | 8/1916 | Slater | 75/101 R |
| 1,251,485 | 1/1918 | De Luce | 204/105 R |
| 1,263,727 | 4/1918 | Anderson | 75/76 |
| 1,528,207 | 3/1925 | Greenawalt | 204/105 R |
| 1,539,712 | 5/1925 | Christensen | 75/101 R |
| 1,539,714 | 5/1925 | Christensen | 75/101 R |
| 1,570,777 | 1/1926 | Pike . | |
| 1,588,806 | 6/1926 | Pike et al. . | |
| 1,757,047 | 5/1930 | Hosenfeld et al. . | |
| 2,008,373 | 7/1935 | Tobelmann | 75/18 |
| 2,046,937 | 7/1936 | Curtin | 23/55 |
| 2,586,579 | 2/1952 | Supiro | 23/97 |
| 2,647,830 | 8/1953 | Allen, Jr. et al. | 75/103 |
| 2,647,831 | 8/1953 | Allen, Jr. et al. | 75/103 |

(List continued on next page.)

OTHER PUBLICATIONS

Edmiston, Kenneth J., "An Update on Chloride Hydrometallurgical Processes for Sulfide Concentrates," Paper Presented at the Society of Mining Engineers of SME-AIME Annual Meeting, Los Angeles, Calif., Feb. 26–Mar. 1, 1984, Pre-Print No. 84–114.
McLean, Daniel C., "Chloride Leaching of Copper Concentrates Practical Operational Aspects," Paper Presented at the Feb. 1982 Dallas AIME Meeting.
Wilson, J. P. and Fisher, W. W., "Cupric Chloride Leaching of Chalcopyrite,", *J. Metals*, p. 52 (Feb. 1981).
DeMarthe et al., "A New Hydrometallurgical Process for Copper," Extractive *Metallurgy of Copper (Hydrometallurgy and Electrowinning,* vol. 2), Ed. Yannopoulos et al., Port City Press, Baltimore, pp. 825–848 (1976).
Canada Department of Mines Report, No. 688 (1926).
Canada Department of Mines Report, No. 643 (1924).

FOREIGN PATENT DOCUMENTS

| | | |
|---|---|---|
| 2715 | of 1882 | United Kingdom . |
| 4626 | of 1888 | United Kingdom . |
| 22030 | of 1891 | United Kingdom . |
| 9052 | of 1895 | United Kingdom . |
| 13499 | of 1911 | United Kingdom . |
| 276008 | 8/1927 | United Kingdom . |

*Primary Examiner*—John F. Niebling
*Assistant Examiner*—Terryence Chapman
*Attorney, Agent, or Firm*—Donald E. Degling; Paul H. Ginsburg

[57] ABSTRACT

A process for extractive metallurgy of metal sulfides, in particular copper sulfide ores, in which a metal sulfide mineral feed material is cocurrently oxidized in an aqueous cupric chloride solution in the presence of an oxidant to form a slurry containing a metal hydroxide precipitate; the slurry is leached with an acid; the leach solution is extracted with an organic extractant; the organic extractant is stripped with an aqueous stripping medium; and the copper is electrowon from the aqueous stripping medium. The large amount of acid required for the oxidation reaction is provided by the formation of the metal hydroxide precipitate.

16 Claims, 3 Drawing Figures

U.S. PATENT DOCUMENTS

| | | | |
|---|---|---|---|
| 2,647,832 | 8/1953 | Allen, Jr. et al. | 75/108 |
| 3,194,653 | 7/1965 | Keyes | 75/109 |
| 3,260,593 | 7/1966 | Zimmerley et al. | 75/117 |
| 3,288,599 | 11/1966 | Keyes | 75/109 |
| 3,353,950 | 11/1967 | Junghanss | 75/0.5 |
| 3,436,177 | 4/1969 | Spedden et al. | 23/172 |
| 3,476,554 | 11/1969 | Spedden et al. | 75/109 |
| 3,490,899 | 1/1970 | Krivsky et al. | 75/109 |
| 3,630,722 | 12/1971 | Chew | 75/76 |
| 3,637,372 | 1/1972 | Mayor et al. | 75/101 |
| 3,642,435 | 2/1972 | Allen et al. | 23/117 |
| 3,669,650 | 6/1972 | Elstein et al. | 75/101 |
| 3,673,061 | 6/1972 | Kruesi | 204/105 R |
| 3,674,424 | 7/1972 | Stanley et al. | 23/15 W |
| 3,692,647 | 9/1972 | Chambers et al. | 204/105 R |
| 3,764,490 | 10/1973 | Chambers | 204/52 R |
| 3,767,543 | 10/1973 | Hazen | 204/107 |
| 3,776,826 | 12/1973 | Atadan | 204/107 |
| 3,785,944 | 1/1974 | Atwood et al. | 204/107 |
| 3,798,026 | 3/1974 | Milner et al. | 75/104 |
| 3,879,272 | 4/1975 | Atwood et al. | 204/107 |
| 3,880,732 | 4/1975 | Sardisco | 204/107 |
| 3,888,748 | 6/1975 | Brennecke | 204/108 |
| 3,896,208 | 7/1975 | Dubeck et al. | 423/27 |
| 3,901,776 | 8/1975 | Kruesi et al. | 204/107 |
| 3,922,167 | 11/1975 | Pernichele et al. | 75/109 |
| 3,923,616 | 12/1975 | Atadan et al. | 204/107 |
| 3,951,649 | 4/1976 | Kieswetter, Jr. et al. | 75/117 |
| 3,957,602 | 5/1976 | Johnson et al. | 204/106 |
| 3,972,711 | 8/1976 | Goens et al. | 75/117 |
| 3,998,628 | 12/1976 | Gandon et al. | 75/104 |
| 4,011,146 | 3/1977 | Coltrinari et al. | 204/66 |
| 4,013,457 | 3/1977 | Goens et al. | 75/104 |
| 4,023,964 | 5/1977 | DeMarthe et al. | 75/101 |
| 4,026,772 | 5/1977 | Ammann et al. | 204/106 |
| 4,039,324 | 8/1977 | Stephens, Jr. et al. | 75/72 |
| 4,053,305 | 10/1977 | Smyres et al. | 75/104 |
| 4,070,182 | 1/1978 | Genik-Sas-Berezowsky et al. | 75/103 |
| 4,097,271 | 6/1978 | Swinkels et al. | 75/104 |
| 4,101,315 | 7/1978 | Peters et al. | 75/104 |
| 4,107,009 | 8/1978 | Everett | 204/129 |
| 4,115,221 | 9/1978 | Wadsworth et al. | 204/108 |
| 4,124,379 | 11/1978 | Peters et al. | 75/118 |
| 4,230,487 | 10/1980 | DeMarthe et al. | 75/101 |
| 4,288,304 | 9/1981 | DeMarthe et al. | 75/117 |
| 4,337,128 | 6/1982 | Haakonsen et al. | 204/107 |
| 4,341,742 | 7/1982 | Clark et al. | 423/39 |
| 4,384,890 | 5/1983 | Clevinger et al. | 75/109 |

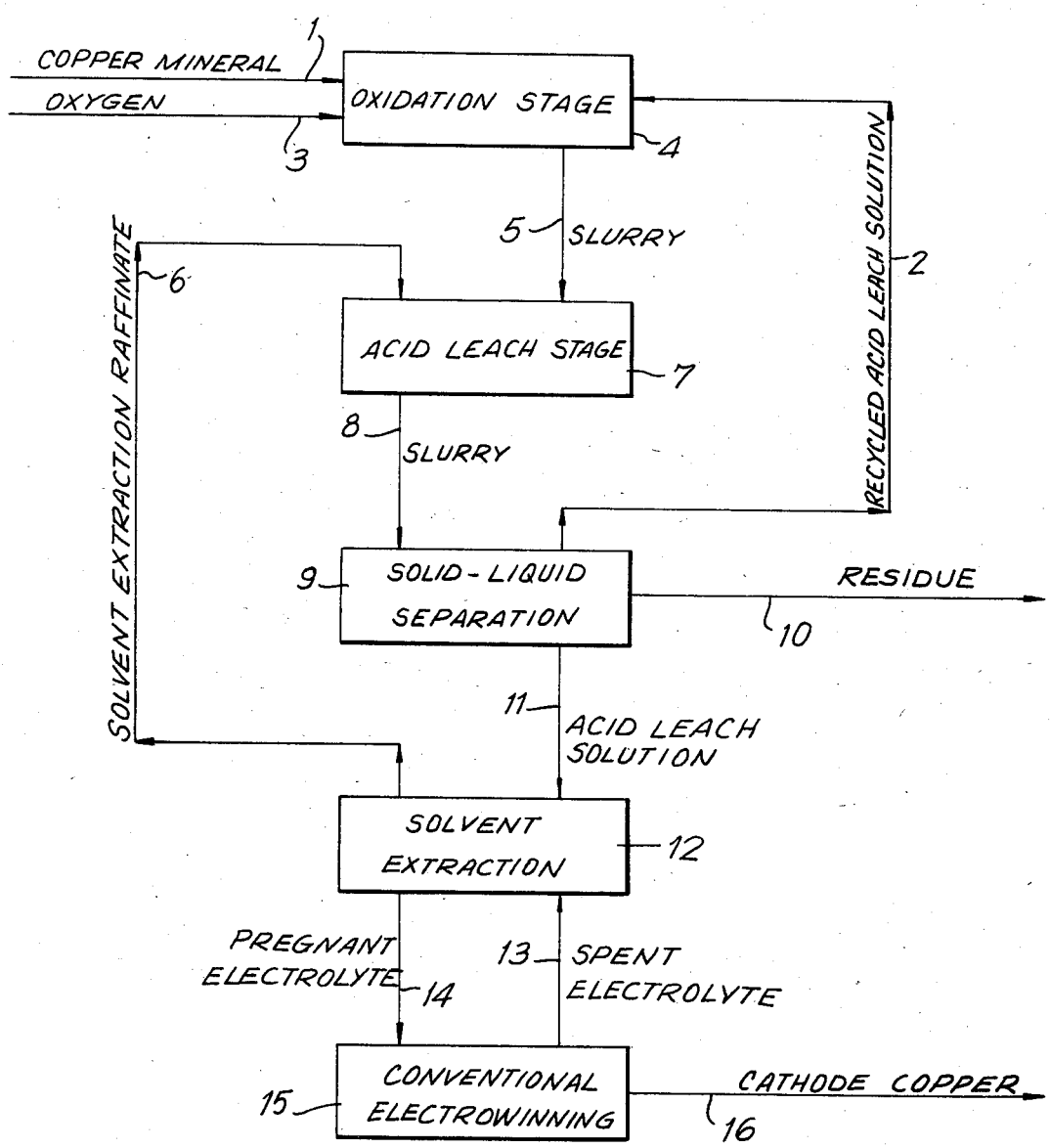

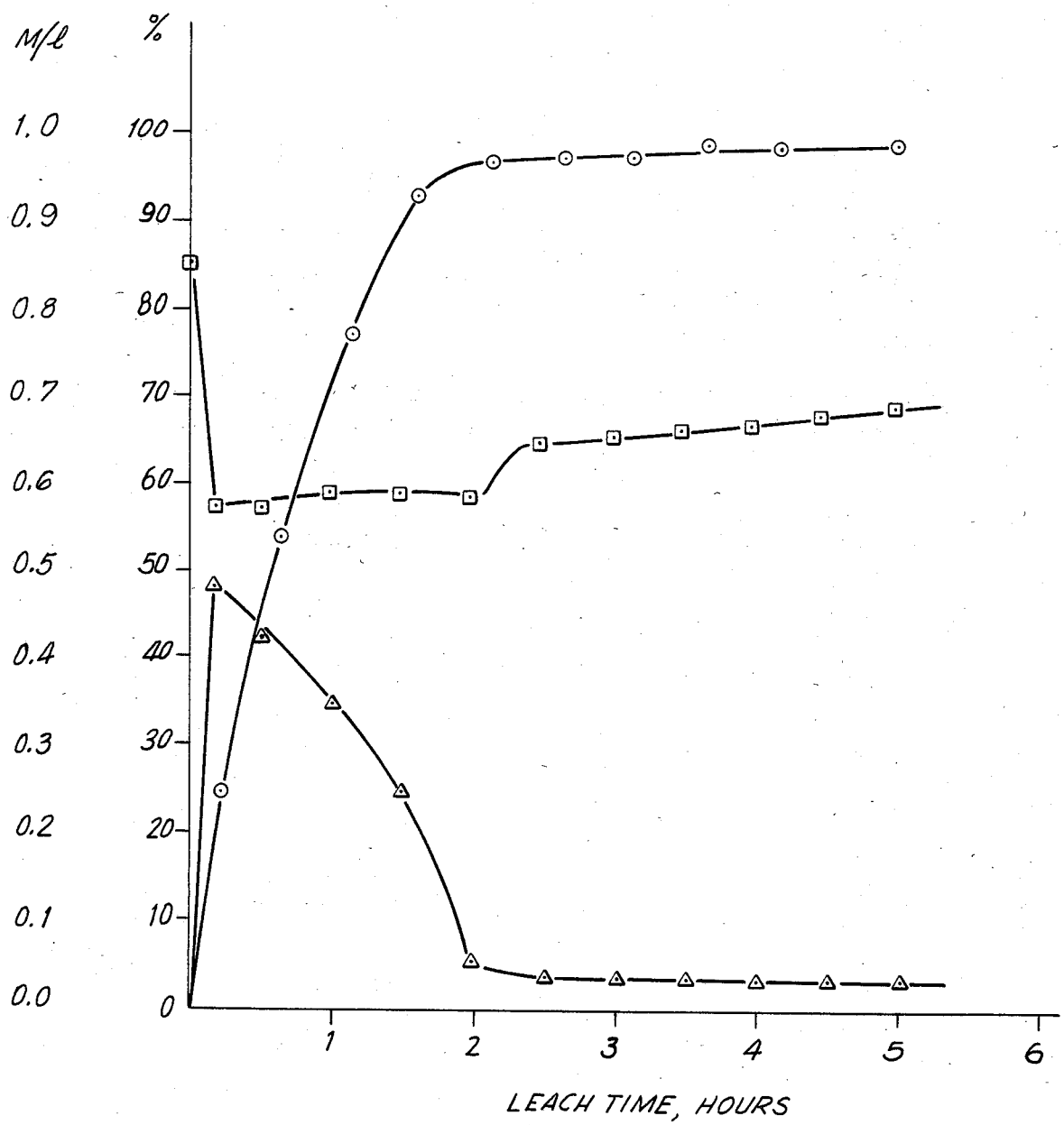

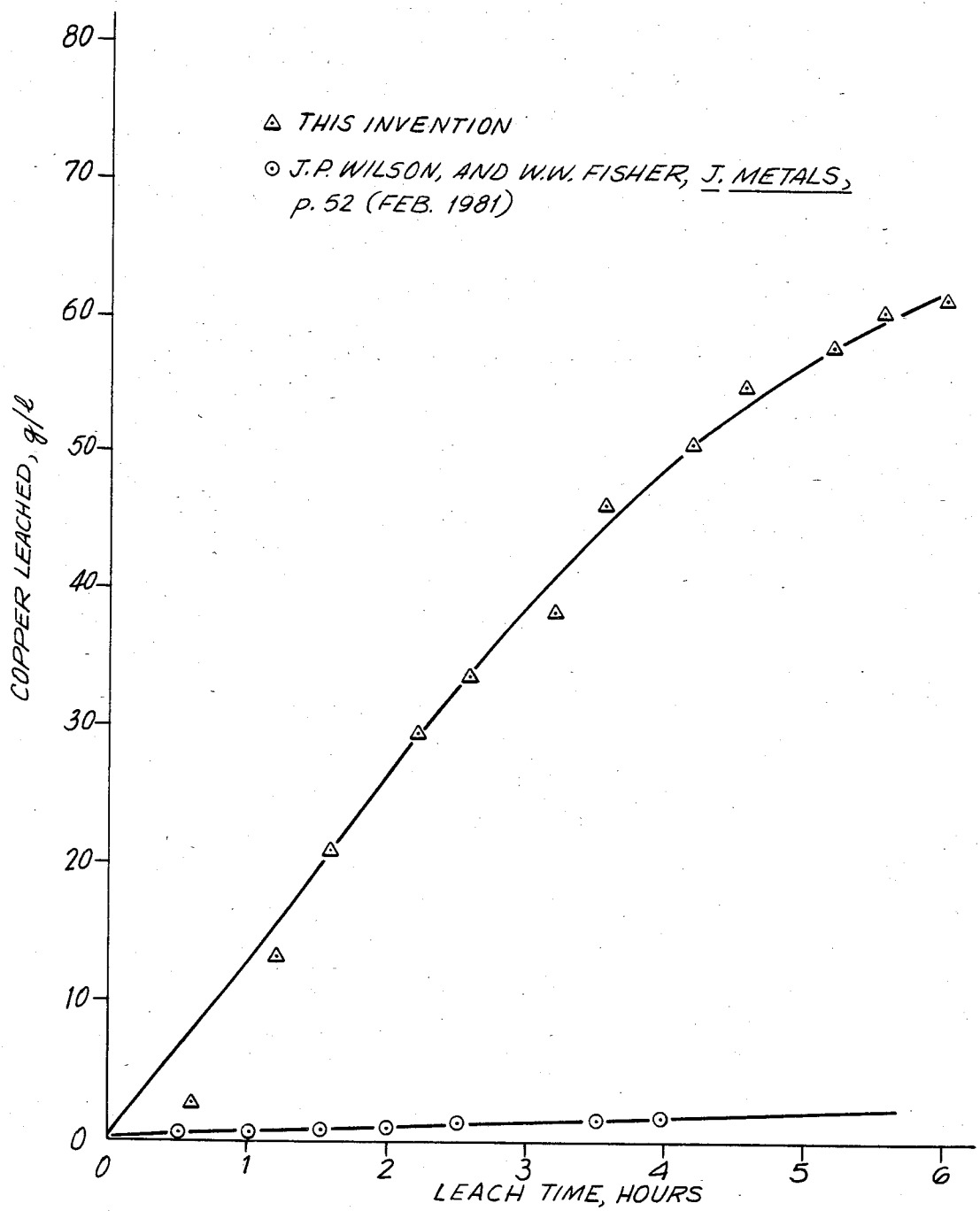

CHLORIDE HYDROMETALLURGICAL PROCESS FOR PRODUCTION OF COPPER

BACKGROUND OF THE INVENTION

The present invention is directed to a method for extracting metals from metal sulfides. More specifically, the invention is directed to a hydrometallurgical process of a type generally known as chloride leaching, wherein a metal sulfide mineral feed material, in particular a copper sulfide, is treated to produce a commercially saleable grade of metal, in particular copper. According to a particular embodiment of the invention, a copper sulfide mineral is introduced into an aqueous solution having dissolved therein cupric and chloride ions, in which the copper sulfides are converted into acid-soluble copper compounds. This is followed by acid leaching, solvent extraction, and electrowinning to produce cathode copper.

Many methods for treatment of sulfide minerals to recover metals therefrom are already known in the art. Two of the principal types are (1) roast/leach/solvent extraction/electrowinning processes and (2) chloride hydrometallurgical processes. None of the known methods, however, is entirely satisfactory with respect to the efficiency of operations on a commercial scale.

Accordingly, it is an object of the present invention to provide a technologically simple hydrometallurgical process for treating copper sulfide minerals to produce a commercially saleable product, which process achieves a high degree of processing per unit volume, leaves pyrite unreacted, and operates at a low temperature and pressure.

SUMMARY OF THE INVENTION

This invention is a process for producing a commercially saleable metal product from metal sulfide minerals. Broadly, the process comprises the steps of:
(a) contacting a metal sulfide with an aqueous cupric chloride solution to leach the metal therefrom, while simultaneously adding an oxidant to oxidize the leached metal, and supplying acid for the oxidation of the leached metal by forming metal precipitate;
(b) dissolving the metal precipitate with an acid;
(c) separating the resulting aqueous and solid phases;
(d) recycling a portion of the aqueous phase of step (c) to step (a);
(e) extracting the metal of the non-recycled aqueous phase of step (c) with an organic phase;
(f) recycling raffinate from step (e) to step (b) for use as the acid;
(g) stripping the metal from the organic phase with an aqueous stripping solution;
(h) electrowinning the metal from the aqueous stripping solution; and
(i) recycling spent electrolyte from step (h) for use as the aqueous stripping solution of step (g).

According to a particular embodiment of the invention, copper sulfide minerals are treated successively to produce copper in the following stages: an oxidation stage; an acid leach stage; a solid-liquid separation stage; a solvent extraction stage; and finally an electrowinning stage to produce cathode copper.

In the oxidation stage, copper is leached with aqueous cupric chloride ($CuCl_2$) in the presence of an oxidant, such as air or oxygen. A chloride to cupric ion ratio of 3 or more is preferred. A supplemental source of ion ratio in the preferred range.

The resulting slurry from the oxidation stage, which includes precipitated cupric hydroxy chloride ($Cu_2(OH)_3Cl$) formed during the oxidation stage, is then treated in an acid leach stage with an acid. In the acid leach stage, cupric hydroxy chloride from the oxidation stage is mixed with and dissolved by the raffinate acid from the solvent extraction stage.

The resulting aqueous phase (acid leach liquor) of the acid leach stage is then separated from the solid recipitated sulfur, pyrites ($FeS_2$) and gangue. The residue may contain precipitated iron residue when the concentrate is chalcopyrite. This iron precipitate may be in any of several forms, such as an amorphous residue with an approximate composition of $Fe_3(OH)_8(Cl)$ or a crystalline jarosite, such as $NaFe_3(SO_4)_2(OH)_6$.

The acid leach liquor is divided into two portions. One portion is recycled to the oxidation stage to provide the aqueous cupric chloride needed for recovering additional copper. The copper content of the other portion is extracted in a solvent extraction stage with a conventional organic extractant. The aqueous phase or raffinate from the solvent extraction stage is recycled to provide acid for the acid leach stage of the process and can be buffered with sulfate ions to minimize the pH change associated with recovering the copper by solvent extraction.

The copper is then stripped from the organic extractant phase. For this purpose, spent electrolyte from a conventional copper electrowinning stage is used. Copper is then recovered from the resulting pregnant aqueous electrolyte in a conventional electrowinning stage.

The critical differences between this invention and the known roast/leach/solvent extraction/electrowinning processes are found in the oxidation step. Both the known processes and in the process of this invention, the product of the oxidation stage is an acid-soluble copper intermediate. There are two general approaches to sulfide concentrate roasting: dead roast and sulfating roast. The dead roast is a high temperature oxidation that produces acid-soluble copper oxides and insoluble ferrites. A sulfating roast produces cupric sulfate with essentially no ferrite production; however, the subsequent sulfuric acid leach and solvent extraction steps result in the net production of sulfuric acid, which must subsequently be neutralized. In both types of roasting processes, conversion to an acid-soluble copper intermediate is effected by the use of high temperatures and oxygen with concomitant production of sulfur dioxide.

According to the invention, low temperatures are used, elemental sulfur is produced and pyrite is left unreacted. The formation of acid-insoluble copper ferrites that occurs in dead roasting is avoided. This invention also avoids the generation of excess acid that occurs in a sulfating roast. The oxidation step of this invention thus selectively converts copper sulfide minerals to an acidsoluble precipitate without the use of high temperatures or the production of sulfur dioxide, copper ferrites or aqueous sulfuric acid that must subsequently be neutralized.

The critical differences between this invention and conventional chloride hydrometallurgy processes are found in the oxidation and solvent extraction steps. In conventional chloride hydrometallurgy (ferric or cupric), sulfides are generally leached countercurrently at low slurry densities. This invention has a cocurrent, high slurry density oxidation stage; in other words, more grams of copper can be leached per liter of leach solution using the process of the present invention than with other chloride hydrometallurgical processes. Conventional processes also generally employ separate leach and oxidation steps, producing copper in the cuprous oxidation state. This invention transforms the copper in the sulfide mineral to a copper intermediate in the cupric oxidation state in a single reactor. As a result, this invention calls for the use of smaller and simpler equipment for the oxidation and solubilization steps than the corresponding leach and regeneration steps of conventional chloride hydrometallurgical processes.

Conventional solvent extraction of copper from chloride solutions requires conversion of cuprous copper to the cupric form. According to this invention, the copper entering the solvent extraction stage is already in the cupric state. Moreover, the acidity of the raffinate from the solvent extraction stage is sufficient to dissolve the acid-soluble copper produced in the oxidation stage.

BRIEF DESCRIPTION OF THE DRAWINGS

FIG. 1 represents in diagrammatic form an embodiment of the process of the present invention.

FIG. 2 illustrates the percent leach, cuprous ion concentration and cupric ion concentration for the treatment of chalcocite in a batch operated oxidation stage.

FIG. 3 illustrates a comparison of the leaching of chalcopyrite according to the present invention with the results of an alternative method.

DETAILED DESCRIPTION OF THE INVENTION

A preferred embodiment of the process of the present invention is shown in diagrammatic form in FIG. 1. The copper feed 1, return acid leach solution 2, and oxygen 3 enter the oxidation stage 4, in which copper sulfides are converted to cupric hydroxy chloride and sulfur. The oxidation stage 4 may, for example, consist of three cocurrent mix tanks which are operated at a temperature of, e.g., 85° C. to 90° C. The output 5 of the oxidation stage 4 is combined with solvent extraction raffinate 6 in the acidification stage 7. Acid in the raffinate reacts rapidly with the copper hydroxy chloride. The acidification stage 7 may, for example, consist of two cocurrent mix tanks. The output 8 of acidification stage 7, comprising soluble copper and insoluble gangue 10, enter the solid/liquid separation stage 9. Solid/liquid separation stage 9 may, for example, employ a conventional countercurrent decantation. The solid gangue 10 is sent to disposal. A portion of the liquid 11 is cooled and sent to solvent extraction stage 12 and a portion of the liquid 2 is sent to the oxidation stage. The solvent extraction stage 12 in general involves several steps: a clarifier treatment, generally carried out using an organic diluent to remove any remaining fine solids which comprise primarily elemental sulfur and sulfur coated leach residue; a copper load step which produces solvent extraction raffinate 6; a wash step to wash chloride from the loaded organic extractant; and a copper strip step wherein spent electrolyte 13 is loaded with copper to produce pregnant electrolyte 14. The pregnant electrolyte 14 is then sent to a conventional electrowinning cell 15 wherein copper is recovered as cathode copper 16.

The following description of a preferred embodiment of the process of the present invention uses representative components to illustrate the course of the reactions. The inputs to the oxidation stage are one or more sulfide minerals and a leach solution. Chalcopyrite ($CuFeS_2$) and chalcocite ($Cu_2S$) will be used to represent sulfide minerals in the description of an embodiment of the process which follows, although other metals, such as nickel, cobalt, and zinc can be extracted from their sulfides using the process of the present invention. Oxygen will be used to represent an oxidant. The leach solution in the process as exemplified below is an aqueous solution which must contain cupric ions and chloride ions.

The present invention may be more clearly understood through an analysis of what are believed to be the various chemical reactions and equilibria of the process. The overall transformation that occurs in the oxidation is stage shown for chalcocite (Equation 1) and chalcopyrite (Equation 2):

$$3Cu_2S + 2Cu^{++} + 6H_2O + 3O_2 + 4Cl^- \rightarrow 4Cu_2(OH)_3Cl + 3S \quad (1)$$

$$12CuFeS_2 4Cu^{++} + 15O_2 + 18H_2O + 8OCl^- \rightarrow 8Cu_2(OH)_3Cl + 12FeO(OH) + 24S \quad (2)$$

In a cupric chloride solution, the chloride exists in several forms: free chloride (as would exist in a solution of, e.g., sodium chloride) and copper complexes (i.e., chemically bonded to copper). The copper can be present in two oxidation states: cupric ($Cu^{++}$) and cuprous ($Cu^+$). Oxygen, chloride ions and cupric ions by themselves are in general very unreactive toward copper sulfides.

Both cupric and cuprous ions are present in chloride solution as various chloride complexes. In the absence of a complexing ligand, such as chloride ion, cupric ion would exist in a water solution as $Cu(H_2O)_4^{++}$. In chloride solution, various cupric chloride complexes form (e.g., Equation 3):

$$Cu(H_2O)_4^{++} + Cl^- \rightarrow Cu(H_2O)_3Cl^+ + Cu(H_2O)_3Cl^+ + H_2O \quad (3)$$

Thus, a solution of cupric and chloride ions may have $Cu(H_2O)_4^{++}$, $Cl^-$, $Cu(H_2O)_3Cl^+$, $Cu(H_2O)_2Cl_2$, $Cu(H_2O)Cl_3^-$, and $CuCl_4^=$ present in solution. The exact concentration of any given species in solution is dependent on the total concentration of cupric ions and chloride ions and on the temperature.

Uncomplexed $Cu(H_2O)_4^{++}$ is present in a cupric sulfate solution. It can be concluded that the uncomplexed cupric ion is relatively unreactive, because little or no leaching occurs in cupric sulfate solution. One or several of the cupric chloride complexes therefore must be reactive.

A high degree of chloride complexing may be achieved through a high ratio of chloride to cupric ions (3 or more), as well as a high concentration of chloride ions. On the other hand, the cupric ion concentration must be high enough that there is an acceptable concentration of cupric chloride complexes. Formation of the desirable cupric chloride complexes appears to continue right up to the chloride ion solubility limit; thus, the known methods generally call for a chloride concentration at or near the limit of solubility. This invention provides process conditions which maintain cupric chloride reactivity at a maximum level throughout the leaching stage.

The other form of copper present in solution is cuprous copper. Cuprous ion is present as $CuCl_2^-$, $Cu_2Cl_4^=$, and $CuCl_3^=$, but not as $CuCl$ (which is very insoluble) or as uncomplexed $Cu^+$ (which is unstable with respect to disproportionation portionation in water). It is believed that in the oxidation stage, a cupric chloride complex reacts with a copper sulfide mineral to produce copper in the cuprous state as for example, in Equations 4 and 5:

$$Cu_2S + 2CuCl_4^= \rightarrow 4CuCl_2^- + S \tag{4}$$

$$CuFeS_2 + 3Cu^{++} \rightarrow 4Cu^+ + Fe^{++} + 2S \tag{5}$$

Conventional chloride leaching methods allow cuprous ions to build up in the leaching solution. This leads to difficulties, because cuprous ion is a much stronger complexer 2.5 chlorides are lost from the cupric chloride equilibrium for every cuprous ion produced. In Equation 4, two cuprous ions are produced per copper leached, while in Equation 5, four cuprous ions are produced per copper leached. Thus, 5 to 10 chlorides lost to cuprous ions for every copper leached. As a result, not only is cupric ion consumed, but the lower availabilty of chloride ions also results in the remaining cupric ions being less complexed with chloride and therefore less reactive in leaching. In other words, as cupric ion is consumed and cuprous ion generated, the average reactivity of the remaining cupric ions is decreased: there are fewer free chlorides per cupric ion available to form the reactive cupric ion complexes after the production of cuprous chloride complexes.

According to the present invention, this problem is overcome by oxidizing the cuprous ion to cupric ion as leaching takes place (Equation 6):

$$4Cu^+ + O_2 + 4H^+ \rightarrow 4Cu^{++} + 2H_2O \tag{6}$$

The cupric ion concentration is increased, and the effective increase in available chloride results in a higher cupric ion reactivity.

Large amounts of acid are also needed for the oxidation reaction. One obvious source of acid is the solvent extraction raffinate. However, the requirements of solvent extraction limit the allowable concentration of acid. If the solvent dxtraction raffinate were used, the oxidation stage would be operated at a low leach density and would require vigorous mechanical agitation of a large liquid volume. Other potential sources of acid would be a strong hydrochloric acid solution and an electrowinning electrolyte. A simple and cheap method of regenerating a strong hydrochloric acid solution is not available. The addition of large amounts of acid from an electrolyte implies a chloride electrolyte, i.e., electrowinning directly from the leach solution. This would have significant disadvantges with respect to the efficiency of purification of the product.

According to this invention, the acid supply problem is solved through the formation of a copper hydroxide, which exists primarily as a precipitate (Equation 7):

$$2Cu^{++} + 3H_2O + Cl^- \rightarrow Cu_2(OH)_3Cl + 3H^+ \tag{7}$$

It has been found that the composition of the precipitate is usually close to the composition that would be expected for a cupric hydroxy chloride dimer, as in Equation 7. According to this invention, a leach solution saturated with cupric hydroxy chloride complexes is employed. Unexpectedly, the formation of this copper precipitate does not inhibit the leaching reaction. In those cases where iron is present (e.g., chalcopyrite), the iron is oxidized from ferrous ion to ferric ion and precipitated as one of several iron hydroxide-oxides. This also generates acid.

The oxidation step is cocurrent as opposed to the traditional countercurrent operation. This means that fewer pieces of equipment are needed. By putting oxygen into the cupric copper. Chlorides are also liberated by the oxidation. This results in an overall faster reaction of the sulfides and allows for the processing of a greater amount of feed per unit volume. This simplifies operation of treatment facilities, because smaller equipment is required.

Many of the advantages of the process of the present invention result from the maintenance of a low cuprous ion concentration. This is achieved in part by the formation of copper hydroxy chloride precipitates. The various per se known reactions as combined according to the invention result in advantages which do not arise if the reactions are run separately, as in the conventional methods. A particularly significant advantage is that the amount of copper that can be processed per unit volume per unit time is greatly increased. Another advantage is that the process can operate at a modest pH (low acidity), because large amounts of acid do not need to be present prior to oxidation or to be added continuously during oxidation.

Following the oxidation stage is the acid leach stage. The acid leach stage may take the form of a series of stirred tanks following the oxidation step. Flow is still cocurrent; however, the solution volumetric flow rate increases markedly due to the addition of solvent extraction raffinate, and reaction times become very short. Essentially complete dissolution of the copper hydroxy chloride precipitate may be achieved rapidly and is apparently limited only by the speed of mixing (Equation 8):

$$Cu_2(OH)_3Cl + 3H^+ \rightarrow 2Cu^{++} + 3H_2O + Cl^- \tag{8}$$

The fast reaction time and minimal mixing requirements allow for the use of small vessels with low power mixers. An alternative arrangement for this stage would be a simple pipeline reactor with a static mixer.

The process stream is then subjected to a conventional solid/liquid separation. Solids are rejected to a tailings pond. The liquid stream is then split, with a small portion being sent to the head of the oxidation stage and the rest forwarded to solvent extraction. The acid leach solution must then be cooled to an acceptable temperature for solvent extraction and clarified to remove traces of solids prior to solvent extraction.

In the solvent extraction stage, a portion of the copper in the acid leach solution is exchanged with acid carried by an extractant dissolved in an organic phase (Equation 9):

$$Cu_{(a)}^{++} + 2RH_{(o)} \rightleftharpoons 2H_{(a)}^+ + R_2Cu_{(o)} \tag{9}$$

In Equations 9 and 10, the subscript "(a)" designates the aqueous phase and the subscript "(o)" designates the organic phase. The organic extractant "RH" can be one of several commercially available organic copper extractants, such as Acorga P5100, Henkel 65N and Shell 529S. Equation 9 is reversible reaction, so that high concentrations of $H^+$ may prevent maximal loading of copper in the organic phase or prevent loading in subsequent stages of extraction. One method of increasing the amount of copper that can be recovered from a given solution is to neutralize the acid; however, this acid is needed in the acid leach stage.

The addition of sulfates to the aqueous solution, which form bisulfate when H+ concentration is high (as in the solvent extraction stage), permits larger amounts of copper to be extracted. Equation 10 shows ideally what happens:

$$2Cu_{(a)}^{++} + 2SO_{4(a)}^{=} + 4RH_{(o)} \rightarrow 2HSO_{4(a)}^{-} + 2H_{(a)}^{+} + 2R_2Cu_{(o)} \quad (10)$$

The same amount of free acidity is present in Equation 10 as in Equation 9, but twice the copper is recovered. Of course, the amunts of advantage due to sulfate addition depends on the amount of sulfate added. The amount of sulfate added should not be so high as to result in a substantial decrease in the chloride concentration due to solubility limits. The impact of sulfate has been found to be insignificant on the oxidation stage.

The presence of zinc in solution has been found to improve the solvent extraction step. In theory, zinc complexes chloride ion, and this results in a higher concentration of free cupric ion in solution. It is thought that at the lower temperature of the solvent extraction step, the zinc complexes chloride ion more stronger than cupric ion, while at the higher temperatures of the oxidation stage, the reverse is true. The observation that addition of colorless zinc chloride to a cupric chloride solution changes the green solution to a bluish green color, which is more characteristic of higher concentrations of uncomplexed cupric ion, supports this analysis. At high temperature, the solution remains a very bright green color, with or without zinc chloride.

The solvent extraction step is thus improved relative to conventional methods by the addition of a zinc salt, such as zinc chloride, instead of customary salts (e.g., sodium or potassium chloride) and by the addition of sulfates. In addition, the solvent extraction feed may be mixed with the diluent, less the extractant, as a first step. This either replaces a clarifier or serves as the clarifier for the final removal of suspended solids in the solvent extraction feed.

The copper is extracted from the organic extractant by spent electrolyte from a conventional electrowinning cell. The spent electrolyte becomes the aqueous stripping solution for obtaining metal from the organic phase of Equation 10. Contamination of the electrolyte by chloride is controlled by contacting a portion of the electrolyte with copper metal. When oxygen-free conditions exist, chloride is removed by the formation of insoluble cuprous chloride. As long as chloride is present to precipitate cuprous ion as the chloride, cupric ion and copper metal will react to form small amounts of cuprous ion.

The copper is finally recovered in a conventional sulfuric acid/copper sulfate electrowinning cell. This route for electrowinning is much easier than chloride electrowinning and is more compatible with the preceeding process steps. An immediate disadvantage of chloride electrowinning here is that cuprous copper is largely absent from this process. Moreover, the chloride leach solution needs to be treated for the removal of impurities before electrowinning. Since many impurities can be present, and these may vary between ore deposits and even within ore deposits, it is more practical to remove the copper from the leach solution. In this process, solvent extraction is used to separate copper from impurities.

The copper, once it is in the organic phase, can be recovered in various ways. Conventional sulfate system electrowinning is considered to be the most practical and reliable method.

A supplemental source of chloride ion can be added to the aqueous cupric chloride solution from a variety of different sources, such as $CuCl_2$, $CuCl$, $FeCl_2$, $HCl$, $NH_4Cl$, $NaCl$, $KCl$, $MgCl_2$, and $ZnCl_2$. Putting large amounts of ferrous and ferric ions into solution is undesirable, so their chlorides should not be used extensively; small quantities, however, would cause insignificant problems. Those chlorides which form insoluble sulfates, such as $CaCl_2$ and $BaCl_2$, should in general not be used.

Oxygen may be supplied as pure oxygen or as oxygen in air. Pure oxygen is favored, because oxidation of cuprous ion to cupric ion is first-order in oxygen partial pressure. Other oxidants that could be used include $NaOCl$, $NaClO_2$, $NaClO_3$, $Cl_2$, and $H_2O_2$. The principal disadvantage of oxidants other than oxygen is higher cost; many of them are faster acting and easier to use.

Since the process will work with chalcopyrite, and chalcopyrite is the least reactive of the common copper sulfide minerals, any of the copper sulfide minerals typical of sulfide ores will be a suitable feed for the process. For example, chalcopyrite, chalcocite, covellite and bornite may all be treated according to the process of the present invention. In addition, the feed may contain some copper oxide minerals, such as cuprite. The concentrate feed is obtained from copper-bearing ore by conventional methods, primarily by froth flotation. The copper sulfide feed particle size is that typical of flotation concentrates.

The process conditions used in various stages of the process can vary over wide ranges. In the oxidation stage, operation at atmospheric pressure is satisfactory between about 70° C. and the boiling point of the leach solution. With a chalcocite concentrate in which the sulfides are relatively reactive, the transfer of oxygen into the leach slurry is rate-limiting for most of the leach. Hence, a temperature of 80° C. to 85° C. is desirable in order to maintain a high partial pressure of oxygen. For a more unreactive sulfide like chalcopyrite, a higher temperature, e.g., 90° C. to 95° C., is desirable. The higher temperature results in a faster cupric chloride chalcopyrite reaction rate and a slower cuprous oxidation reaction rate due to the lower partial pressure of oxygen. However, in both the chalcopyrite and chalcocite cases, the objective is to balance sulfide leaching with cuprous oxidation. The practical upper temperature limit is the melting point of sulfur. The pressure can also be varied, requiring the use of pressure vessels.

The acid leach stage is so rapid that no special temperature or pressure control is justified. The temperature in the solvent extraction stage is generally kept lower than in oxidation, as commercially available extractants decompose at uneconomic rates if used above 50° C. Thus, with the suggested oxime-type extractants, an operating temperature of about 35° C. to 45° C. would be best.

In general, the cupric ion concentration of the initial solution should be between about 20 and 100 grams per liter (0.3 to 1.6 molar), and preferably about 50 g/l (0.8 molar). The cuprous ion concentration, on the other hand, should be the minimum value which can be conveniently achieved. This is generally on the order of 2 g/l (0.03 molar). The sulfate concentration should be between 0 and about 100 g/l, and preferably about 40 g/l (0.4 molar). The chloride salt concentration should be the maximum value compatible with solubility requirements; when the salt employed is sodium chloride, this is about 250 g/l (5 molar).

In order to disclose more clearly the nature of the present invention, the following examples illustrating specific embodiments of the invention are given. It should be understood, however, that this is done solely by way of example and is intended neither to delineate the scope of the invention nor limit the ambit of the appended claims.

EXAMPLE 1

CHALCOCITE LEACHING

FIG. 2 shows the percent leach, cuprous concentration and cupric concentration for the cupric chloride leaching of chalcocite in a batch-operated oxidation stage. The copper product was in the form of cupric hydroxy chloride (the copper concentration shown in FIG. 1 is soluble copper only). The initial conditions were 0.86 N cupric ion and 5.0 N chloride ion at 1 atmosphere oxygen and 90° C. The concentrate (18.7%Cu; 250 g/l) reacted at an average rate of 25.9 g Cu/l/hr during the first 100 minutes of leaching.

EXAMPLE 2

CHALCOCITE LEACHING

In a batch-operated oxidation stage, the same as in Example 1, the initial conditions were 0.66 N cupric and 5.0 N chloride at one atmosphere oxygen and 85° C. The concentrate (27.1% Cu; 350 g/l) reacted at an average rate of 26.3 g Cu/l/hr during the first 210 minutes of leaching. After 210 minutes, 97.1% of the copper sulfides had reacted, equilvalent to 92 g copper processed per liter of solution.

EXAMPLE 3

CHALCOPYRITE LEACHING

FIG. 3 shows a comparison of the leaching of chalcopyrite using the process of this invention with the leaching of chalcopyrite reported in Wilson, J. P. and Fisher, W. W., *J. Metals* p. 52 (Feb. 1981). The contrasted conditions were similar in many ways. Both experiments took place in agitated batch reactors, at atmospheric pressure, initial cupric concentrations of 0.79 M and temperatures of 90° C. There was a small difference in chloride concentration (5.O M this work, 6.35 M in the other work) which actually favors the other work.

As can be seen in FIG. 3, there is a dramatic difference in copper leached per unit volume (49 g/l of copper in this work and 1.6 g/l of copper in the other work at time equal to 4 hours). This difference can in part be attributed to the smaller amount of copper available for leaching (5.9 g/l in the other work relative to 70.3 g/l in this work). However, only 27 percent of a smaller amount of copper was reacted, whereas according to this invention, 70 percent of a larger amount of copper was reacted in the same time. This improved performance is explained by the superiority of the process according to the invention, and in particular on account of the continuous oxidation of cuprous to cupric ion achieved by supplying oxygen to the leach reactor.

The terms and expressions which have been employed are used as terms leach reactor. of description and not of limitation, and there is no intention in the use of such terms and expressions of excluding any equivalents of the features shown and described or portions thereof, but rather it is recognized that various modifications are possible within the scope of the invention claimed.

We claim:

1. A process for extracting metals from metal sulfides, comprising the stepp of:
   (a) contacting a metal sulfide with a first solution which is an aqueous cupric chloride solution to leach the metal therefrom and to form a second solution containing said metal and cuprous chloride, while adding an oxidant to oxidize the cuprous chloride in said second solution, whereupon a metal hydroxide is precipitated in said second solution, the precipitation of said metal hydroxide resulting in the formation of hydrogen ions;
   (b) adding an acid to said second solution, thereby dissolving the metal hydroxide precipitate with said acid, thus forming a third solution in contact with a remaining metal sulfide;
   (c) separating the third solution from the remaining metal sulfide;
   (d) recycling a portion of the separated third solution to step (a);
   (e) extracting the metal remaining in the non-recycled portion of said separated third solution with an organic phase;
   (f) recycling raffinate from step (e) to step (b) for use as the acid;
   (g) stripping the metal from the organic phase with an aqueous stripping solution;
   (h) electrowinning the metal from the aqueous stripping solution; and
   (i) recycling spent electrolyte from step (h) for use as the aqueous stripping solution of step (g).

2. The process according to claim 1 wherein the ratio of chloride to cupric ions in the aqueous cupric chloride solution in step (a) is 3 or more.

3. The process according to claim 1 wherein a supplemental source of chloride ion is added to the aqueous cupric chloride solution and wherein the supplemental source of chloride ion is selected from the group consisting of $CuCl_2$, $CuCl$, $FeCl_2$, $HCl$, $NH_4Cl$, $NaCl$, $KCl$, $MgCl_2$, $ZnCl_2$ and mixtures thereof.

4. The process according to claim 1 wherein the oxidant is selected from the group consisting of oxygen, air, $NaOCl$, $NaClO_2$, $NaClO_3$, $Cl_2$ and $H_2O_2$.

5. The process according to claim 1 wherein the metal sulfide is selected from the group consisting of chalcopyrite, chalcocite, covellite, bornite and mixtures thereof.

6. The process as claimed in claim 1 wherein the metal precipitate is a copper hydroxy chloride.

7. The process according to claim 1 wherein step (a) is carried out at atmospheric pressure and at a temperature between about 70° C. and the boiling point of the aqueous cupric chloride solution.

8. The process according to claim 7 wherein step (a) is carried out at a temperature between about 80° C. and 95° C.

9. The process according to claim 1 wherein step (e) is carried out at a temperature below about 50° C.

10. The process according to claim 1 wherein step (e) is carried out at a temperature between about 35° C. and 45° C.

11. The process according to claim 1 wherein a zinc salt is added to the non-recycled aqueous phase of step (c).

12. The process according to claim 1 wherein sulfate ions are added to the non-recycled aqueous phase of step (c).

13. The process of claim 1, wherein said metal is selected from the group consisting of copper, nickel, cobalt and zinc.

14. A process for extracting copper from copper sulfide ore or copper-iron sulfide ore comprising the steps of:
  (a) contacting the ore with a first solution which is an aqueous cupric chloride solution having a chloride to cupric ion ratio of 3 or more, said contacting being performed at atmospheric pressure and at a temperature between about 70° C. and the boiling point of the aqueous cupric chloride solution to leach copper therefrom and to form a second solution containing said copper, while adding oxygen to oxidize the leached copper in said second solution, whereupon a copper hydroxy chloride is precipitated in said second solution, the precipitation of said copper hydroxy chloride resulting in the formation of hydrogen ions;
  (b) adding an acid to said second solution, thereby dissolving the copper hydroxy chloride precipitate with said acid, thus forming a third solution in contact with a remaining metal ore;
  (c) separating the third solution from the remaining ore;
  (d) recycling a portion of the separated third solution to step (a);
  (e) extracting the copper remaining in the non-recycled portion of said separated third solution with an organic phase at a temperature below about 50° C.;
  (f) recycling raffinate from step (e) to step (b) for use as the acid;
  (g) stripping the copper from the organic phase with an aqueous stripping solution;
  (h) electrowinning the copper from the aqueous stripping solution; and
  (i) recycling spent electrolyte from step (h) for use as the aqueous stripping solution of step (g).

15. The process according to claim 14 wherein a zinc salt is added to the non-recycled aqueous phase of step (c).

16. The process according to claim 14 wherein sulfate ions are added to the non-recycled aqueous phase of step (c).

* * * * *